(No Model.)
G. W. MARBLE.
METAL ROLLER FORGING MACHINE.
No. 425,951. Patented Apr. 15, 1890.
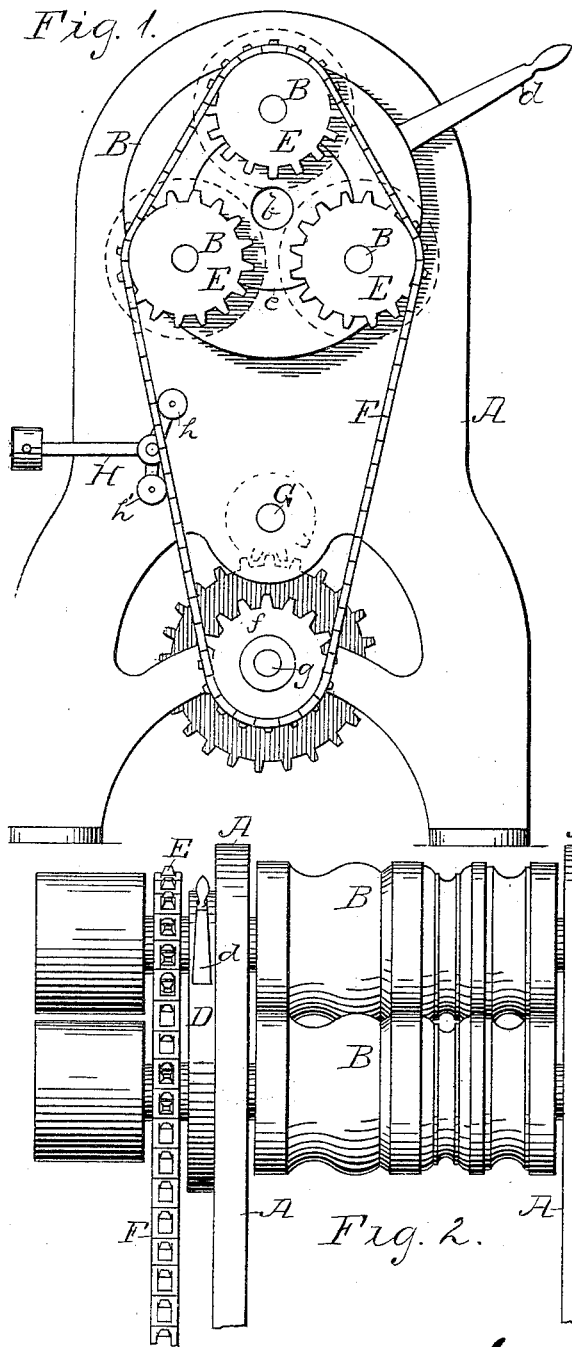
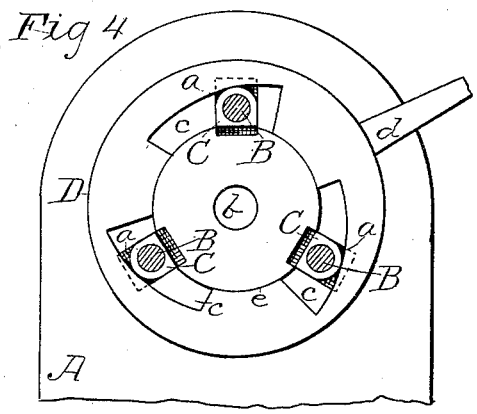
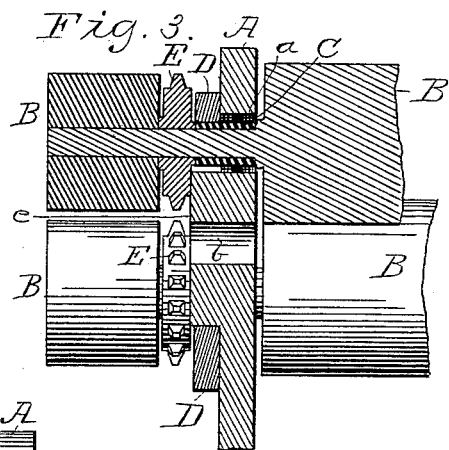
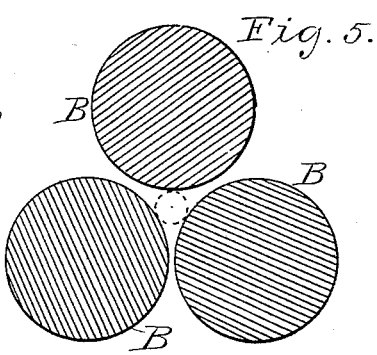
Witnesses
A. C. Capron
Loui G. Capron
George William Marble
Inventor
By his Attorney
Frank D. Thomason

UNITED STATES PATENT OFFICE.

GEORGE WILLIAM MARBLE, OF PLYMOUTH, INDIANA, ASSIGNOR OF ONE-FOURTH TO WILLIAM W. SIMONS, OF SAME PLACE.

METAL ROLLER-FORGING MACHINE.

SPECIFICATION forming part of Letters Patent No. 425,951, dated April 15, 1890.

Application filed November 21, 1889. Serial No. 331,078. (No model.)

*To all whom it may concern:*

Be it known that I, GEORGE WILLIAM MARBLE, of Plymouth, Marshall county, Indiana, have invented certain new and useful Improvements in Metal Roller-Forging Machines, of which the following is a full, clear, and exact description, reference being had to the accompanying drawings, and to the letters of reference marked thereon.

The object of my invention is to enable metal-workers to straighten pipe, or curve pipe or bar iron, or to form cylindrical metal devices or metal objects having a circular exterior, thus dispensing with considerable drop-forging work and supplying a long-felt want among machinists and metal-workers, substantially as hereinafter fully described, and as illustrated in the drawings, in which—

Figure 1 is an end elevation. Fig. 2 is a side elevation thereof. Fig. 3 is a longitudinal central section through a part of the same; Fig. 4, an end elevation of the upper part thereof, showing the actuating-gear removed. Fig. 5 shows a cross-section of the rolls.

In the drawings, A represents the vertical supporting-frames of my invention, and B B B longitudinal horizontal parallel rolls, the journals of which have bearings in blocks C C C, which move in openings $a\ a\ a$, which are elongated radially from a common center in said frame A. The openings $a$ correspond, preferably, in length and breadth, are an equal distance removed from each other, and are equally distant from the common center from which they radiate. At this common center is an opening $b$, through which the work is fed to and withdrawn from between the rolls B.

In order to form a cylindrical piece of work—for instance, an iron pillar for building purposes—or a piece of work whose exterior is circular—as, for instance, an iron stair-railing post—the rolls B for the former are of the same diameter throughout the entire length thereof, between which the forming takes place, whereas in the latter such conformation of varying diameters is given the rolls as to produce the desired conformation, as shown in Fig. 2. The rolls B all revolve in the same direction, so that when the work is turned between them all parts of its circumference at a given point along its length come in contact with all that part of the rolls in the same transverse plane therewith.

Where the work to be formed is of the same diameter throughout its length, or where the work is to be tapered from its most advanced point to a greater diameter at its rear end, the rolls may be journaled at a fixed center and maintained there; but where the work is of various diameters, as in the aforementioned case of a stair-railing post, it is necessary that the rolls when the work is placed between them be bodily and simultaneously moved inward toward the said common center until they bear against the work and then keep pressing inward against the same and approaching nearer each other until the work is given the formation desired. This radial adjustment of the rolls I accomplish by extending the blocks C laterally, so that they project beyond the plane of the outer surface of the vertical frames, in which said blocks move, and there surround said blocks with a ring D, the inner circumference of which is concentric with opening $b$, toward which said blocks are movable, and which is provided with three eccentric offsets $c\ c\ c$ at equal intervals apart. These offsets are made with reference to blocks C, which when said rolls are farthest apart have their projecting outer ends bearing against the eccentric surfaces of said offset farthest from said common center. By turning said ring, through the medium of the handles $d$, radiating therefrom, the blocks are pushed by the eccentric surfaces of said offsets $c$ simultaneously toward the common center before referred to. In order to center said ring, I prefer to make a circular boss $e$, concentric to the opening $b$, the sides of which are of such diameter as to afford a bearing for the inner circumference of ring D. Each end of the rolls is similarly journaled and adjustable, so that by manipulating handles $d$ alike the rolls may be made to approach the work together.

In order to revolve the rolls, I secure to the ends (preferably at only one end of the machine) of the journals of said rolls the sprocket-wheels E E E and engage them, through the medium of an endless link-chain belt F, by the sprocket $f$ on the corresponding end of the speed-shaft $g$, which is run by suitable gearing by the drive-shaft G. As the rolls approach each other the belt F may become slightly loose. This slack I can easily take up by a belt-tightener, which consists of a lever H, weighted on its outer end and fulcrumed near the belt, as shown, on a suitable stud projecting laterally from frame A, which has two short ends to its inner arm, that have an idle-pulley $h\ h'$, journaled on studs projecting from their ends, respectively, which bear against said belt F, one on one side and the other on the other, as shown, and automatically take up the slack.

By extending the ends of the rolls beyond their bearings in frame A and having one of said rolls revolve in a direction contrary to the other two a bar or strip of metal or a pipe could be bent to any degree of curvature possible to be obtained by the various adjustments of said roll. This contrary revolution of, say, the uppermost roll shown in the drawings, could be easily obtained by running the belt F under the sprocket E thereof, so as to engage the lowest segment of the same.

I do not wish to be confined to the use of three rolls, because it is obvious more could be used and the same result accomplished, although it is believed not so well as with three only. It is not, moreover, considered as absolutely necessary that all three rolls should revolve at the same speed.

For some kinds of work it is thought that by differing the speed of the rolls a scraping effect would be had on the work which would be beneficial in its results.

What I claim is—

1. The combination of three rolls adjustable toward a common center and revolving in the same direction, having any suitable corresponding conformation, and between which the work is placed longitudinally and formed, as set forth.

2. The combination of three rolls adjustable simultaneously radially to a common center, all revolving in the same direction and having a corresponding conformation, and between which the work is placed longitudinally and formed, as set forth.

3. The combination of three forming-rolls revolving in the same direction and between which the work is placed longitudinally and formed, as set forth.

4. The combination, with forming-rolls revolving in the same direction, of the frames A, having three elongated openings radiating from a common center, and a feed-opening at said common center, and bearing-blocks for the journals of said rolls adjustable in said elongated openings of frame A, as set forth.

5. The combination, with forming-rolls revolving in the same direction, of frames A A, each having elongated openings therein radiating from a common center, and a feed-opening therein concentric to said common center, bearing-blocks for the journals of said rolls, and ring D, having offsets $c\ c\ c$ in its inner circumference, as set forth.

6. The combination, with forming-rolls revolving in the same direction, of frames A A, each having elongated openings therein radiating from a common center, and a feed-opening concentric to said common center, bearing-blocks in said elongated openings for the journals of said rolls, sprocket E, secured to ends of said journals, belt F, sprocket $f$, and drive-shaft G, as set forth.

7. The combination, with the forming-rolls revolving in the same direction and having their journals extending through their bearings, and frames A A, each having elongated openings therein radiating from a common center, and a feed-opening concentric to said center, of bearing-blocks in which said rolls are journaled, ring D, having the offsets $c\ c\ c$ in its inner circumference, sprockets E, belt F, sprocket $f$, and drive-shaft G, as set forth.

GEORGE WILLIAM MARBLE.

Witnesses:
A. C. CAPRON,
LORIE G. CAPRON.